April 23, 1940.　　　　L. L. CROSS　　　　2,198,572
VEHICLE DOOR OPERATING GEAR
Filed Feb. 11, 1939　　　2 Sheets-Sheet 1

INVENTOR.
LESTER L. CROSS
BY
Louis Illmer
ATTORNEY.

April 23, 1940.  L. L. CROSS  2,198,572
VEHICLE DOOR OPERATING GEAR
Filed Feb. 11, 1939  2 Sheets-Sheet 2

INVENTOR.
LESTER L. CROSS
BY Louis Ilmer
ATTORNEY.

Patented Apr. 23, 1940

2,198,572

UNITED STATES PATENT OFFICE 2,198,572

VEHICLE DOOR OPERATING GEAR

Lester L. Cross, Cortland, N. Y., assignor to Brockway Motor Company, Inc., Cortland, N. Y., a corporation of New York Application February 11, 1939, Serial No. 255,842

5 Claims. (Cl. 268—68)

My invention relates to automotive equipment and is more particularly concerned with a positive control linkage for remotely opening or closing foldable twin door panels through an obtuse angle of considerably more than 90° in an improved wide range manner by manually actuated lever means kept within convenient reach of a driver seated within the confines of a truck cab, bus, van, step-well delivery body, dump cart or the like motorized vehicle. Said operating linkage is of the double beat toggle type preferably arranged to lie in a common plane located closely beneath the body deck in a perpendicular relation to the doorway and which toggle device is adapted to automatically exert a counter thrust that lockingly retains the door panels against unwanted displacement after being shifted into either their open or their closed panel positions.

In the present instance, such jointed door panels are preferably but not necessarily hinged upon the rear jamb of a front doorway to swing outwardly and rearwardly from an aligned closed position into a folded open position in which both the inner and outer door panels are brought into a superimposed relation upon the exterior of a body side wall in substantial parallelism therewith. Adjoining vertical edges of the closed panels cooperate by a wedging action to seal the door against rattle and inclement weather. While in open position, my positive gear serves to automatically lock and retain the folded panels against an adjacent side wall buffer block. Included in my linkage is a retractible toggle link of the slip type preferably connected to an overhead portion of the inner panel. Cooperating therewith in a fixed length radius rod located beneath the floor level, that smoothly guides the outer panel between its open and closed positions without binding effects or rattle. Such disposition makes for a neat gear installation that does not obstruct the passageway leading to the driver's seat and one that can be easily handled without a pronounced tendency to stall between extreme shift positions.

The object of my improvements is to provide for a simple and effective remote control linkage of the character indicated and a door operating gear that as new standardized equipment, may be applied to a large variety of vehicle bodies.

Reference is had to the accompanying two sheets of drawings which are illustrative of a preferred exemplification, and in which:

Fig. 1 fragmentally represents an elevational side view of a separate cab compartment equipped with my operating devices with the door panels in closed position.

Fig. 3 shows an overhead cross-sectional view taken along 3—3 of Fig. 1 depicting my door linkage in its closed relationship, while

Figure 2:
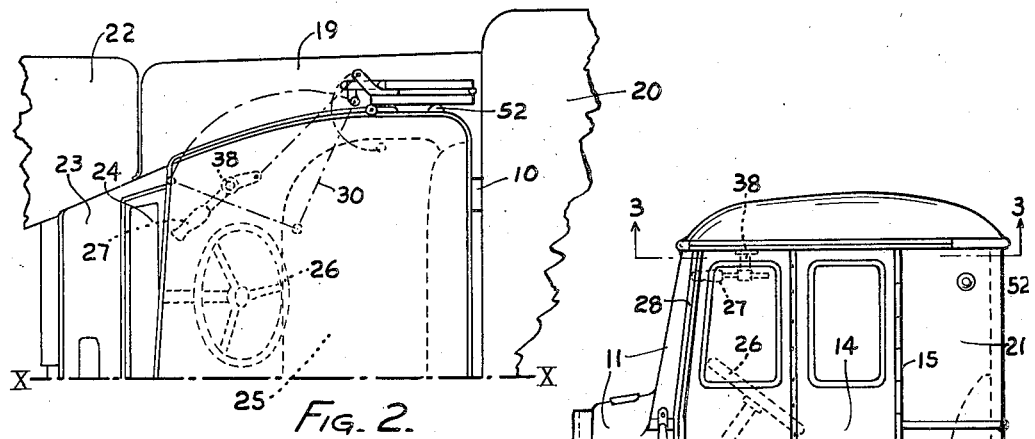
Fig. 2 is a semi-top view of Fig. 1 with the panels swung into their folded opened position.
Figure 1:
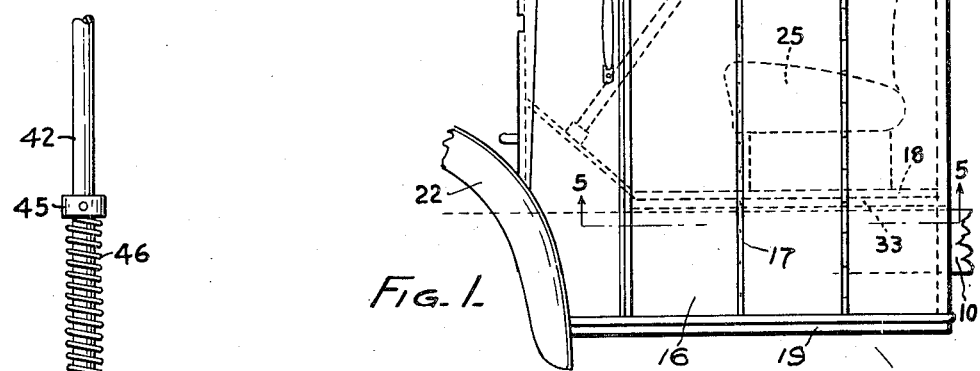

Referring more specifically to said drawings, 10 schematically indicates a conventional chassis or frame channel upon which is mounted a driver's cab compartment 11 provided with a forward door jamb post 12 and a mated rearward jamb 13. My foldable door comprises an inner panel 14 that may be hung on the jamb 13 by the primary hinge 15, also an outer panel 16 which may be pivotally adjoined by intermediary pintle means 17 to the forward edge of said inner panel. If desired, the front doorway sill may extend one step below the level of the floor board 18 to align with the running board 19.

The respective panel width may be kept to a substantially like size, except that the sealed upper edge region of the outer panel 16 is preferably tapered to conform with the windshield inclination given to the forward jamb post 12. A load carrying body 20 may be mounted behind the cab 11, or if preferred the cab compartment may be inbuilt in integral van fashion. Said running board may extend laterally outward of the cab side wall 21 between the front wheel fender 22 and the front end of the body 20. The outer panel, when collapsed upon the inner panel in the Fig. 2 fashion, is made to fall within the marginal confines of its running board so as not to stand out or be struck by passing traffic. A windshield 24 and a cowl 23 may complete the frontal closure of such cab structure.

Interiorly said cab compartment may be equipped with a transverse driver's seat 25 indicated in dotted outline, preferably extending crosswise of the mated side walls such as 21. As will be understood, the cab is symmetrically constructed with respect to its longitudinal center line X—X of Fig. 2 and may be provided with similar mated front doors respectively having independent operating gears therefor. A right hand steering wheel 26 may be mounted ahead of such seat and depending from the deck, are separate manipulative gear levers such as 27 located overhead within convenient reach of the driver and respectively linked to actuate an adjacent front door.

The free swinging vertical edge of the outer panel may be lined with a sponge rubber seal strip 28. When the door is closed, said strip is compressingly wedged against the forward jamb to make an anti-rattle, weatherproof joint therewith. In opened position, the door panels are preferably mounted to swing outwardly and rearwardly against the side wall 21, although certain elements hereof may be correspondingly utilized to swing a foldable door inwardly into a suitably shaped floor pit or the like clearance space.

Figure 5:
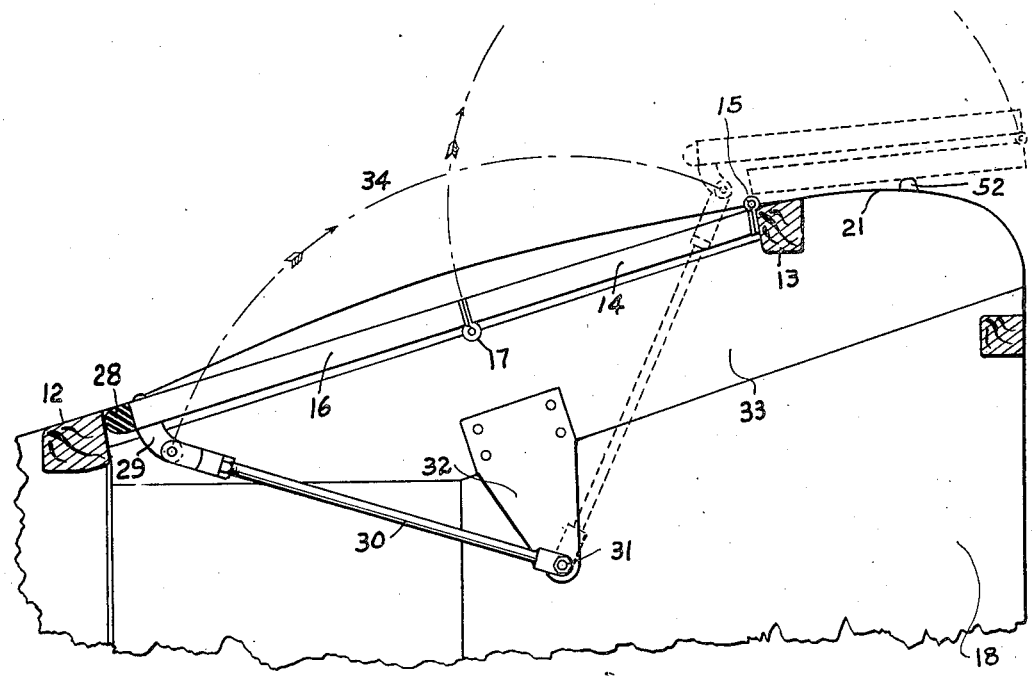
Fig. 5 is taken along 5—5 of Fig. 1 to illustrate the disposition of my radius rod as applied to the relatively wider lower portion of such foldable panels, and Fig. 6 details the retractible end of my chief toggle link.

In order to guide the outer panel 16 into its folded Fig. 2 position, the lower free swinging edge region of said panel may be provided with a pivot bracket 29 to which is attached one end of the rigid radius guide rod 30. The other rod end may engage the fixedly mounted pivot 31 that is upheld by the pivot plate 32. Said fixed pivot is preferably located beneath the floor board level and overhangingly attached to an adjacent underlying floor sill 33 as detailed in Fig. 5. Such disposition serves to clear the doorway of interfering mechanism and to smoothly guide the bracket pivot 29 in an arcuate path marked 34 about the center 31. In accordance with the present layout, such center is preferably located in a substantially right angular relation with respect to the closed door position of the interposed panel pintle 17 and which center is also located inwardly away from such pintle axis to a distance commensurate with a proper length portion of the radius rod 30, as shown. In one extreme of closure travel, the pivot 29 may be brought into adjacency with the forward jamb post 12 and in open door position, into adjacency with the rearward jamb 13, the folded panels being thereby automatically superimposed as indicated in dotted outline by Fig. 5. A virtually concealed radius rod of this kind eliminates the conventional guide track commonly installed exteriorly over the lintel of the doorway. Such track not only mars the appearance of fine body lines but is likely to set up rattle in a freely movable folding door.

Figure 3:
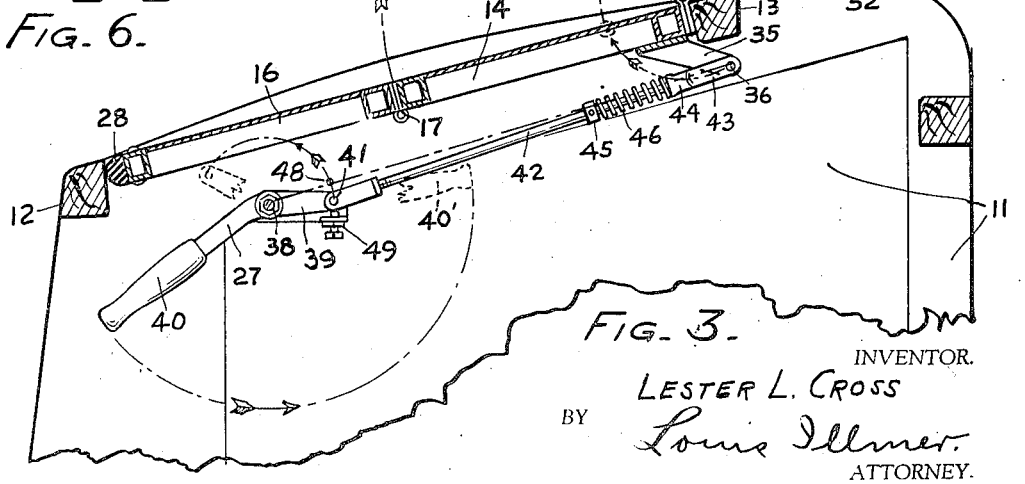

Referring now to the Fig. 3 linkage, this may comprise a laterally offset door bracket 35 mounted to swing about the primary hinge 15. This rearwardly overhanging bracket end mounts a pivot 36 which is here made to rotate through a long sweep, semi-circular path marked 37 of somewhat more than 180 degrees as measured around the axis of said primary hinge. A depending stanchion or stationary lever pivot 38 may be secured to the cab deck inwardly of the door lintel but such subsidiary overhead support may also be otherwise installed. Pivotally mounted on said stanchion, is the manually actuated control lever 27 preferably of the bellcrank type of which one branch may be provided with a control handle 40 and its other branch or toggle arm component 39 is equipped with a toggle pin 41. The apertured hub of the lever 27 rotatably embraces the lower end region of a shouldered stanchion pin 38 which may have a threaded collar applied to the tip thereof as indicated in Fig. 3, whereby reciprocative lever hub movement is prevented lengthwise of the stanchion axis.

Figure 6:
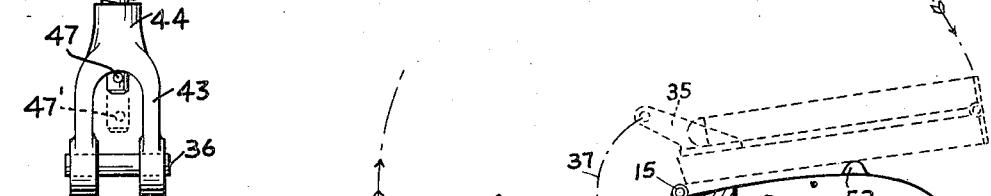

A yieldable contractible toggle link 42 interconnects said toggle pin with the bracket pivot 36, said link having a fixed yoke at one end and a spring mounted forked clevis or the like retractible stub 43 at the opposite end. As detailed in Fig. 6, said link may be slidably entered into the sleeve portion 44 of such stub end. A set collar 45 is locked upon the link shank and preferably has a helical retaining spring 46 interposed under initial tension between said sleeve and its spaced collar. The outermost link end may slidably extend through said sleeve and be provided with a cotter pin or the like link stop means 47 that normally seats upon one sleeve end. Such cottered link end may assume its lifted dotted position 47' when my toggle pin exerts a predominating thrust lengthwise of the interposed compression spring 46.

It will be observed that in the Fig. 3 door position, the lever pin 41 has been pressed inwardly through its closed dead center toggle position designated 48. The length of the link 42 is so proportioned that its stop pin 47 will then be lifted to an appreciable extent and correspondingly subject the spring 46 to maximum compression. An inwardly directed thrust component is thereby imposed upon the closed panels which substantially locks the door in place and serves as an anti-rattle agency against road jars or the like disturbances. An adjustable stop lug 49 may be appended to the stanchion 38 whereby to limit toggle overtravel in one extreme of lever arm movement.

Figure 4:
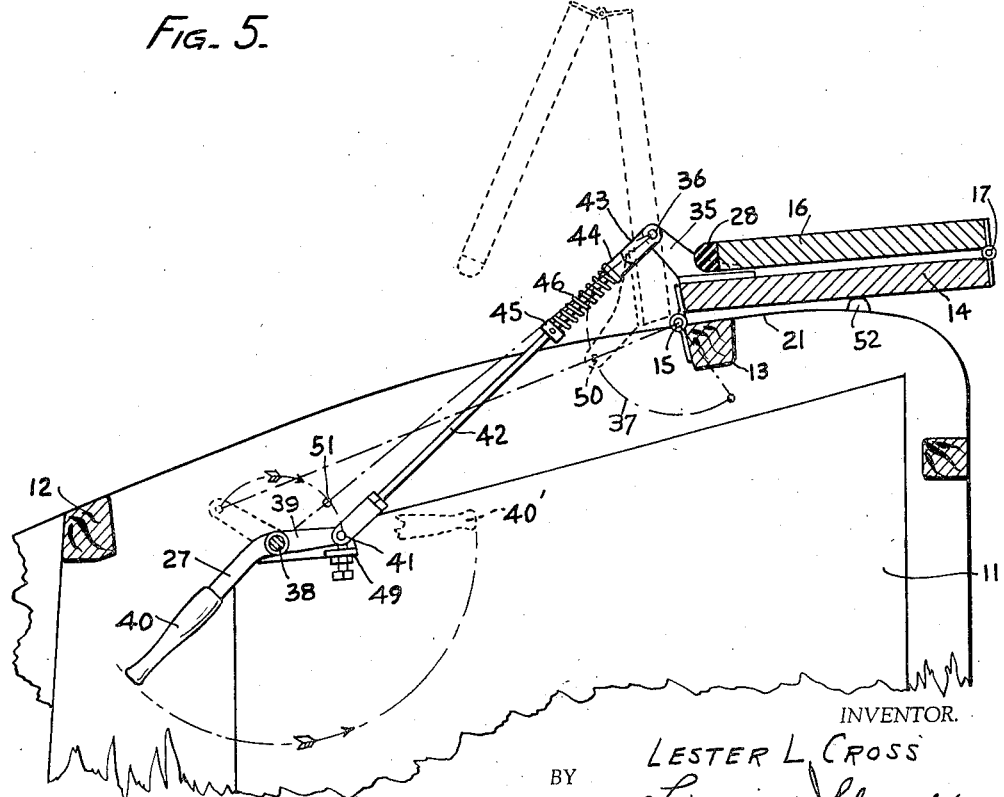
Fig. 4 is a similar view disclosing the linkage shifted into its open door position.

By shifting the handle 40 rearwardly in the counterclockwise or arrowed direction through somewhat less than 180 degrees into its other extreme shift position 40', the door panels become partially folded and will then stand in their incompletely opened or intermediate position represented in dotted outline in Fig. 4 in which the pivot 29 is definitely guided along the path 34 by the radius rod 30 in unison with the gear movements. By such manipulation, the toggle pin 41 will have been pressed through its closure dead center position 48 and whereupon the expanded spring allows the link cotter 47 to return into a seated condition. However, during such initial door opening period, the interposed bracket pivot 36 is in turn obliged to pass through an auxiliary dead center 50 wherein said pivot falls into toggle alignment with the axis of the toggle pin 41 and the primary jamb hinge 15. Prior to reaching such critical position 50, the drag link 42 permits the door gear to operate freely without stalling.

Upon reaching such auxiliary dead center, the handle may by a dextrously timed movement, be reversed into a clockwise direction to complete a wide opening of the door, thereby imposing a toggle thrust along the link 42 which finally pushes the door panels into their fully folded open position represented by full lines in Fig. 4. In my long swing layout, the toggle link 42 is alternately subjected to tension and to end thrust, the control handle 40 being given a corresponding double beat and returned to its original shift position to effect the desired wide door opening action. It will be observed that in the present closure gear, all link elements of my double beat toggle lie in the same plane, the pins 36, 38 and 41 thereof being herein disposed in parallelism relative to the primary door pintles 15 whereby to provide for an easily manipulative mechanism in which the door panels are automatically retained by self-locking toggle action against inadvertent movement after reaching their respective fully opened or closed positions.

When fully opened, the toggle pin 41 will also have been passed through another or supplementary dead center position 51 in which the slidable link stub is again retracted and the spring 46 compressed. When the arm 39 abuts the stop lug 49, the thrust of such link serves to automatically lock the opened door against the body side to again retain the same in anti-rattle fashion against the side wall buffer 52 until the control lever is deliberately brought back through its dead center toggle position. In releasing to close such locked door, said control lever is given a similar back and forth movement in a return direction which brings the gear into its Fig. 3 relationship, it being pointed out that the lever 39 stands in substantially one and the same position whether the door is fully opened or closed. Since the supplementary dead center 51 lies in a different position from its mate 48, a corresponding compensation in the overall length of my retractible link 42 will be required, it being apparent that a definitely fixed length would be inappropriate for present purposes and cause binding of my toggle linkage.

Where separate remote control levers are resorted to for each side door the manipulative handle of one such is placed within convenient reach of the driver when seated behind the steering wheel. Either or both of my gear actuated and rod guided doors may be selectively shifted by a pneumatic booster or the like power driven means or if preferred, a simple linkage may be resorted to to place the control of both levers closely adjacent to the steering wheel. As applied to house-to-house delivery trucks and to dump bodies or the like road making trucks, it is often desired to leave one or more side doors widely open without extending beyond the running board or projecting into the path of closely passing traffic. My gear enables the operator under inclement weather conditions, to rapidly and tightly close either door at will from within the cab confines. As will be evident, like instrumentalities may be utilized in mounting the primary door hinge on the forward jamb 12.

The foregoing is descriptive of a door gear that has been found eminently satisfactory in extensive practice and which specification when read in connection with the accompanying drawings, is believed to make apparent to those skilled in this art, the more outstanding advantages afforded by my improvements, it being understood that the novel features thereof are subject to considerable latitude in execution, all without departing from the spirit and scope of my invention as defined in the appended claims.

I claim:

1. In a vehicle body including a side wall provided with a sectionalized door having mated panels hinged together edgewise for coplanar closure of which the inner panel is hung upon primary pintle means upheld by a doorway jamb, guide means for folding the outer panel into superimposed collapse upon the inner panel when the latter is opened outwardly through an obtuse angle into substantial parallelism with the side wall, and a toggle jointed gear having all pivots thereof disposed in axial parallelism with the primary pintle means, said gear comprising a contractible link component and a manipulative double-beat control arm component mounted to rock upon stationary pivot means located interiorly of the doorway confines and of which link one end is pivotally attached to the inner panel and its other end is operatively adjoined to the control arm by a toggle pin interposed to lie in substantial dead center alignment with said one pivoted link end and the stationary pivot means when the door is fully closed, said gear being so organized and arranged that when rocking said arm outwardly from its dead-center position the toggle pin is carried toward the doorway into a certain non-aligned position that initiates a door opening movement and which arm by a reversed next successive inward rocking movement serves to complete door opening and automatically imposes a counter-closing thrust on the folded panels when fully collapsed.

2. In a vehicle body including a side wall provided with a sectionalized door having mated panels hinged together edgewise for coplanar closure of which the inner panel is hung upon primary pintle means upheld by a doorway jamb, guide means for folding the outer panel into superimposed collapse upon the inner panel when the latter is opened outwardly through an obtuse angle into substantial parallelism with the side wall, and a toggle jointed gear having all pivots thereof disposed in axial parallelism with the primary pintle means, said gear comprising a link component and a minpulative double-beat control arm component mounted to rock upon stationary pivot means located interiorly of the doorway confines and of which link one end is pivotally attached to the inner panel and its other end is operatively adjointed to the control arm by a toggle pin disposed to shift inwardly through two different dead centers lying in a common path and respectively dependent upon whether the door stands in its fully opened or its closed position, said gear being so organized and arranged that when rocking said arm outwardly from either of such dead center positions the toggle pin is carried toward the doorway into a certain non-aligned position that initiates a corresponding door movement and which arm by a reversed next successive inward rocking movement serves to complete the initiated door movement.

3. In a vehicle body including a side wall provided with a sectionalized door having mated panels hinged together edgewise for coplanar closure of which the inner panel is hung upon primary pintle means upheld by a doorway jamb, guide means for folding the outer panel into superimposed collapse upon the inner panel when the latter is opened outwardly through an obtuse angle into substantial parallelism with the side wall, and a toggle jointed gear having all pivots thereof disposed in axial parallelism with the primary pintle means, said gear comprising a link component and a manipulative double-beat control arm component mounted to rock upon stationary pivot means located interiorly of the doorway confines and of which link one end is pivotally attached to the inner panel and its other end is operatively adjoined to the control arm by a toggle pin interposed to lie in stopped substantial dead center alignment with said one pivoted link end and the stationary pivot means when the door is fully opened or fully closed, said gear being so organized and arranged that when rocking the control arm outwardly from said stopped dead center position the toggle pin is carried toward the doorway into a non-aligned position that initiates a certain door movement and which arm by a reversed next successive inward rocking movement serves to complete the initiated door movement, the toggle pin for both the door opening and the door closure movements starting to rock from and being returned into a common stop position.

4. In a vehicle body including a side wall provided with a sectionalized door having mated panels hinged together edgewise for coplanar closure of which the inner panel is hung upon primary pintle means upheld by a doorway jamb, guide means for folding the outer panel into superimposed collapse upon the inner panel when the latter is opened outwardly through an obtuse angle into substantial parallelism with the side wall, and a toggle jointed gear having all pivots thereof disposed in axial parallelism with the primary pintle means, said gear comprising a contractible link component and a manipulative double-beat control arm component mounted to rock upon stationary pivot means located interiorly of the doorway confines and of which link one end is pivotally attached to the inner panel and its other end is operatively adjoined to the control arm by a toggle pin interposed to lie in substantial dead center alignment with said one pivoted link end and the stationary pivot means when the door is fully opened, said gear being so organized and arranged that when rocking said arm outwardly from its dead center position the toggle pin is carried toward the doorway into a certain non-aligned position that initiates a door closure movement and which arm by a reversed next successive inward rocking movement serves to complete door closure and automatically imposes a counter-opening thrust on the panels when brought into coplanar relationship.

5. In a vehicle body including a side wall provided with a sectionalized door having mated panels hinged together edgewise for coplanar closure and of which the inner panel is hung upon primary pintle means upheld by the rearward door jamb, guide means for folding the outer panel into superimposed collapse upon the inner panel in substantial parallelism with said side wall when said door is fully opened, a bracket carried alongside a face of the inner panel and overhangingly extending rearwardly and interiorly behind the primar pintle axis when said door is closed, a pivot mounted upon the end region of the extended portion of said bracket to move about the primary hinge axis between its closed and fully opened door positions through an angle greater than 180 degrees, and a toggle linkage for actuating said bracket pivot, said linkage comprising a link component of which one end region is attached to said bracket pivot and the other link end is pivotally adjoined by a toggle pin to a control lever arm component mounted to turn upon stationary pivot means located forwardly of said rearward door jamb, all of the pivots comprised in such toggle linkage being disposed in axial parallelism with the primary pintle means.

LESTER L. CROSS.